A. W. McCORD.
SOAP DISPENSER.
APPLICATION FILED FEB. 26, 1919.
1,305,476.
Patented June 3, 1919.
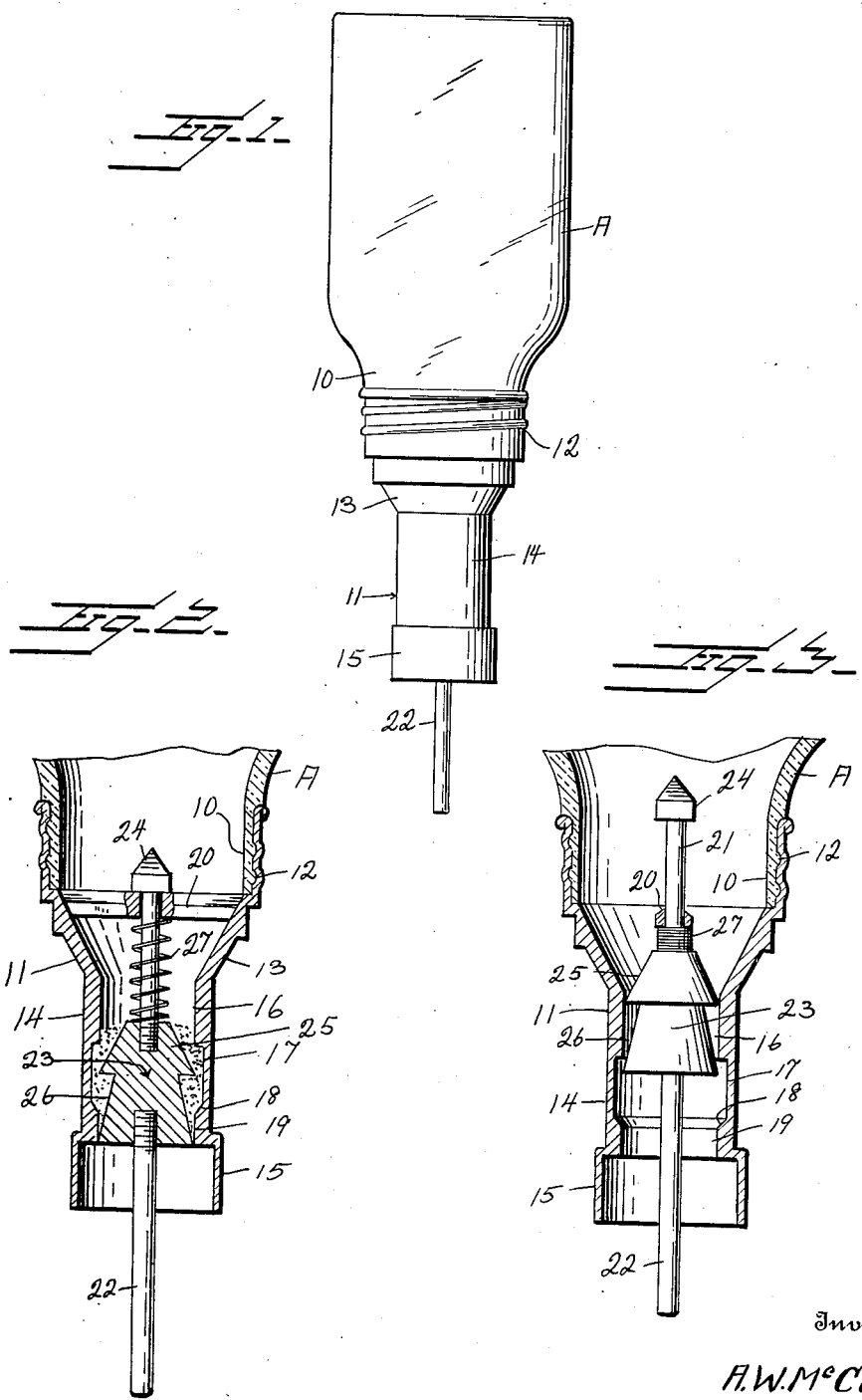
Inventor
A. W. McCord
By Frederick S. Stitt
Attorney

UNITED STATES PATENT OFFICE.

ARTHUR W. McCORD, OF WASHINGTON, DISTRICT OF COLUMBIA.

SOAP-DISPENSER.

1,305,476.	Specification of Letters Patent.	Patented June 3, 1919.

Application filed February 26, 1919. Serial No. 279,281.

*To all whom it may concern:*

Be it known that I, ARTHUR W. McCORD, a citizen of the United States, residing at Washington, in the District of Columbia, have invented certain new and useful Improvements in Soap-Dispensers, of which the following is a specification.

This invention relates to dispensing devices, and particularly to means for dispensing flaky soap or other flaky, granular, or powdered commodities, such as malted milk, bromo seltzer, etc.

The general object of my invention is to provide an improved dispensing valve so constructed that it may be manually shifted from a closed to an open or discharging position, which valve shall be very simple of construction, not liable to clog or otherwise get out of order, and which shall be positive in its action.

A further object is to provide a device of the character above described which shall only discharge a predetermined amount of the commodity at each actuation, and in which there shall be no danger of a continuous stream of the commodity being discharged by a partial actuation of the valve.

A further object is to provide a device which is thoroughly sanitary, and which may be thoroughly washed and cleansed at any time desired by taking the valve apart, and which shall be economical in that it conserves the commodity and prevents it being wasted.

Other objects will appear in the course of the following description.

My invention is illustrated in the accompanying drawings, wherein:—

Figure 1 is a side elevation of a container provided with my dispensing valve;

Fig. 2 is a fragmentary enlarged vertical section of the valve in the lower portion of the container, the valve being in its closed position; and Fig. 3 is a like view to Fig. 2, but showing the valve in its opened or discharging position.

Referring to these drawings, A designates a container which may be of any suitable form and which is preferably transparent, though not necessarily so, and is supported in inverted position in any desired manner as, for instance, by a bracket above a washstand. The neck 10 of this container A is contracted and screw-threaded.

Having screw-threaded engagement with the neck is the valve casing and discharge spout designated generally 11, which is enlarged in diameter at its upper end to fit the neck of the container A and is screw-threaded, as at 12, to have screw-threaded engagement with this neck. Extending downwardly from this enlarged portion 12 is a downwardly tapering conical portion or hopper 13. Then the wall of the valve casing on its exterior extends straight downward, as at 14, and at its lower end is diametrically enlarged, as at 15. Below the tapering portion 13 of the casing the interior surface of the casing extends straight downward, as at 16, with a uniform diameter and then is enlarged in diameter, as at 17, and the lower wall of this enlargement 17 is downwardly and centrally inclined, as at 18, and then the interior face of the casing extends straight downward, this portion 19 of the casing having a diameter approximately the same as the diameter of the portion 16. Extending across the upper end of the portion 13 of the casing is a transverse bar 20 which is convergently beveled upon its upper surface so as to form a sharp edge, and which is perforated at its middle for the passage of a stem.

The stem is preferably made as illustrated in two sections 21 and 22, these sections having screw-threaded engagement with the valve body 23, but it will be understood that the valve body 23 and the stem might be integral. At the upper end of the section 21, the stem is screw-threaded for engagement by a head 24, this head being pyramidal or conical in form. The reason for making the head 24 pyramidal or conical in form and the cross bar 20 with a sharp upper edge and downwardly and outwardly diverging upper faces is to prevent the lodgment thereon of any of the granular, flaky, or powdered material which may be disposed within the container A.

The body 23 is formed to provide an upper frusto-conical valve 25 and a lower frusto-conical valve 26 so that the elevation of the valve body has the form of superposed frustrated cones. Disposed between the upper end of the valve body 23 and the cross bar 20 is a coiled compression spring 27. It will be noticed that the bases of these valves have the same diameter and that this diameter is the same as the interior diameter of the portions 16 and 19 of the valve casing. It will be also seen from Figs.

2 and 3 that the valve 26 is longer than the valve 25. The combined length of these two valves 25 and 26 and of the section 21 of the stem is such that when the head 24 rests upon the cross bar 20, the lower corner of the valve 26 is approximately in alinement with the interior shoulder at the upper end of the portion 15 of the casing, and that when the parts are in this position, which is the position shown in Fig. 2, the base of the valve 25 is below the lower end of the portion 16. Thus, the material contained within the container A and within the portions 13 and 16 will discharge into the enlarged chamber 17 and fill this chamber. Now when the stem is forced upward, and the parts are shifted to the position shown in Fig. 3, the conical valve 25 will move into the contracted portion 16, thus cutting off the portion 17 from the portion 16, and then as the valve body 23 is forced higher up, the material collected in the portion 17 will discharge through the mouth of the valve casing. It will be noted that the portion 19 of the casing has a length equal to or slightly greater than the distance between the lower corner of the valve 25 and the upper wall of the portion 17 so that before the lower corner of the valve 26 can pass the beveled face 18, the upper valve 25 will have cut off the discharge of material. Thus, it is impossible to hold this valve in a partially opened position so as to secure a constant discharge of material through the valve casing. When one valve opens, the other valve closes. By this means, only a predetermined amount of granular or powdered material can be discharged upon a single actuation of the valve stem.

It will be seen that there are no parts in this dispensing valve which are liable to accumulate dirt, and further it will be seen that the soap or other material contained within the valve casing is entirely protected from dust, and that even when the valve is opened to discharge a measure of material, the bulk of the contents of the container is still cut off from the access of dust or dirt. Thus, the contents of the container are kept in a thoroughly good condition. Furthermore, if at any time, it is desired to cleanse the parts, it is only necessary to unscrew the valve casing 11 from the container, unscrew the head 24 from the valve stem, and then remove the valve. This permits the interior surface of the valve casing to be thoroughly cleaned and the valve itself to be cleansed and sterilized if desired.

While this device is particularly applicable to the dispensing of flake soap, it will be seen that it is also applicable for the dispensing of measures of other material in powdered or granular form. Thus, it might be used for dispensing sugar, powdered medicines, etc.

While I have illustrated a form of my invention which is thoroughly effective in practice, yet it is understood that many changes might be made within the scope of the appended claims without departing from the spirit of the invention.

I claim:—

1. A dispensing device including a container having a discharge neck forming a valve casing, an operating stem slidably mounted in the casing and extending below the same, superposed longitudinally spaced valves carried by the stem and shifting therewith, the casing being formed to provide vertically spaced annular portions separated by a diametrically enlarged portion, the upper annular portion fitting the upper valve and the lower annular portion fitting the lower valve, a spring urging said valves downward, and means limiting the downward movement of the valve stem to a position where the lower valve seats in the lower annular portion and the upper valve is disposed in the intermediate enlarged portion, and means limiting the upward movement of the valve stem to a position where the upper valve is within the upper annular portion and the lower valve is disposed above the lower annular portion.

2. A dispensing device including a container, a discharge neck depending therefrom and forming a valve casing, a stem passing longitudinally through the neck of the casing, and two frusto-conical valves mounted on the stem, both of said valves tapering upwardly, the neck of the casing being formed with vertically spaced, annular portions, each having a diameter equal to the greatest diameter of the valves, said portions being spaced from each other a distance not greater than the distance between the bases of said conical valves.

3. A dispensing device of the character described comprising a container and a discharging neck extending therefrom, a valve stem slidingly mounted in the container and carrying two frusto-conical valves, a spring urging the valve stem downward, and means for limiting the downward movement of the valve stem, the interior surface of the neck being formed to provide an upper and lower cylindrical portion having a diameter equal to the extreme diameter of said valves, the lower portion being shorter than the upper portion and the upper valve being shorter than the lower valve, said cylindrical portions being spaced from each other by a chamber having a larger diameter than the extreme diameter of the valves, said chamber having a length slightly less than the distance between the bases of the valves.

4. A dispensing device of the character described comprising a container having a contracted neck and a valve casing forming a discharge neck for the container and enlarged at its upper end to fit the neck of the container, then being gradually contracted downward and then extending approximately straight downward with a uniform exterior diameter, the upper end of the casing being formed with a transverse bar, a valve stem sliding through said bar and having a detachable head limiting the downward movement of the valve stem, upper and lower frusto-conical valves disposed on the valve stem, and a spring disposed between the uppermost valve and the cross bar and surrounding the stem and urging the stem and valves downward, the interior surface of the valve casing being formed to provide upper and lower cylindrical portions having a diameter equal to the extreme diameter of the valves, these portions being spaced from each other by a chamber having a larger diameter than the valves, the lower wall of the chamber being downwardly and centrally inclined and the length of the chamber being less than between the lower corners of the conical valves whereby when the uppermost valve has passed into the uppermost cylindrical portion, the lowermost valve will have passed beyond the lower cylindrical portion.

In testimony whereof I affix my signature.

ARTHUR W. McCORD.